(12) United States Patent
Shikama et al.

(10) Patent No.: US 12,092,869 B2
(45) Date of Patent: Sep. 17, 2024

(54) OPTICAL CONNECTION COMPONENT AND OPTICAL CONNECTION STRUCTURE

(71) Applicant: Nippon Telegraph and Telephone Corporation, Tokyo (JP)

(72) Inventors: Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 484 days.

(21) Appl. No.: 17/287,094

(22) PCT Filed: Nov. 12, 2019

(86) PCT No.: PCT/JP2019/044283
§ 371 (c)(1),
(2) Date: Apr. 20, 2021

(87) PCT Pub. No.: WO2020/110700
PCT Pub. Date: Jun. 4, 2020

(65) Prior Publication Data
US 2021/0382231 A1    Dec. 9, 2021

(30) Foreign Application Priority Data
Nov. 27, 2018    (JP) .................................. 2018-221094

(51) Int. Cl.
*G02B 6/125*    (2006.01)
(52) U.S. Cl.
CPC .................................... *G02B 6/125* (2013.01)
(58) Field of Classification Search
CPC .................. G02B 6/125; G02B 6/305; G02B 2006/12195; G02B 6/138
(Continued)

(56) References Cited

U.S. PATENT DOCUMENTS 6,122,416 A * 9/2000 Ooba ..................... G02F 1/3132
398/1
8,031,012 B2 * 10/2011 Hasegawa ................. G06F 1/04
250/227.12
(Continued)

FOREIGN PATENT DOCUMENTS

JP    2005275343 A    10/2005
JP    2006106480 A    4/2006

OTHER PUBLICATIONS

Lindenmann, et al., "Photonic wire bonding: a novel concept for chipscale interconnects," Optics Express, vol. 20, No. 16, Jul. 30, 2012, pp. 17667-17677.

(Continued)

*Primary Examiner* — Jerry Rahll
(74) *Attorney, Agent, or Firm* — Slater Matsil, LLP

(57) ABSTRACT

Provided is an optical connection component that is constituted of a plate-shaped substrate configured to transmit light to be used, and a resin optical waveguide. The resin optical waveguide is constituted of a resin core formed with a resin through which light to be used passes. For example, the resin core is formed with a light-cured resin. The resin optical waveguide uses air surrounding the resin core as a cladding. The resin core has a folded back structure in which the resin core once separates from the surface of the substrate and then returns to the surface of the substrate, and is connected to each of a first input/output end and a second input/output end of the substrate.

18 Claims, 6 Drawing Sheets

(58) Field of Classification Search
USPC ..... 385/2, 8, 9, 14, 16, 32, 40, 45, 129–132
See application file for complete search history.

(56) References Cited

U.S. PATENT DOCUMENTS

| | | | | |
|---|---|---|---|---|
| 2004/0033007 | A1* | 2/2004 | Ohtsu | G02B 6/43 |
| | | | | 385/14 |
| 2005/0135733 | A1* | 6/2005 | Reid | H01S 5/5027 |
| | | | | 385/39 |
| 2013/0221550 | A1* | 8/2013 | Koos | G02B 6/138 |
| | | | | 264/1.25 |
| 2023/0089592 | A1* | 3/2023 | Saito | G02B 6/305 |
| | | | | 385/49 |

OTHER PUBLICATIONS

Hoose et al., "Hardwired Configurable Photonic Integrated Circuits Enabled by 3D Nanoprinting," 2018 European Conference on Optical Communication (ECOC), Sep. 23, 2018, 3 pages.

* cited by examiner

OPTICAL CONNECTION COMPONENT AND OPTICAL CONNECTION STRUCTURE

CROSS-REFERENCE TO RELATED APPLICATIONS

This application is a national phase entry of PCT Application No. PCT/JP2019/044283, filed on Nov. 12, 2019, which claims priority to Japanese Application No. 2018-221094, filed on Nov. 27, 2018, which applications are hereby incorporated herein by reference.

TECHNICAL FIELD

The present invention relates to optical connection components and optical connection structures, and particularly relates to an optical connection between optical fibers used in optical communication networks, an optical connection between an optical fiber and an optical device such as a laser, a photodiode, an optical waveguide, and an optical modulator, an optical connection component configured to achieve an optical connection between optical devices, and an optical connection structure.

BACKGROUND

Along with the progression of the optical communication network, there is a strong need for improvement in the degree of integration of the optical communication devices and miniaturization of the optical devices. In the related art, planar lightwave circuits (PLC) composed of quartz glass with a glass core are widely used in optical circuits used as optical communications devices. This provides excellent coupling with an optical fiber and high reliability as a material, and is therefore applied to a wide variety of optical functional elements for optical communication such as a light splitter, a wavelength multiplexer demultiplexer, an optical switch, and a polarization control element.

In recent years, in order to deal with the above-described miniaturization of optical circuits, a research on an optical circuit having a high refractive index difference that is designed to have a small minimum bending diameter by increasing the refractive index of the core to increase the refractive index difference from the cladding has been developed. In addition, in recent years, a silicon photonics technique using a core composed of silicon having a strong light confinement property has progressed, and an optical circuit smaller than that of a glass type has been achieved. Silicon processes commonly used for an electronic component and the like can be applied to the silicon photonics technique.

A resin optical waveguide composed of a resin (synthetic resin) such as a transparent high molecular weight polymer is also well known. In addition, as a light modulating element, a wavelength conversion element, and an amplification element, an optical circuit including a core composed of a ferroelectric material typified by lithium niobate ($LiNbO_3$) and the like has also been widely used. In addition, as a light emitting element, a light receiving element, and a light modulating element, a group III-V semiconductor typified by indium phosphide (InP), gallium arsenide (GaAs) and the like is also available, and the light emitting element, the light receiving element, the light modulating element, and the like of an integrated optical circuit type including these semiconductors with an optical wave guiding mechanism have also been widely used. The ferroelectric or semiconductor optical waveguides also have a greater refractive index than glass and provide a strong light confinement, and as such, miniaturization of the circuit can be expected. The above-described optical functional elements are collectively referred to simply as an optical device.

Along with the above-described miniaturization of the optical device, the demand for miniaturization of the optical input/output part of the optical waveguide is increasing. In the related art, in an example of optical connection (light connection) at the optical input/output part of a quartz glass-based PLC, the connection pitch cannot be set to a value equal to or smaller than the cladding diameter of the optical fiber, and therefore the optical connection to the optical fiber is typically performed after the connection pitch is expanded on the optical circuit. As such, the optical connection of the PLC has a problem in that the connection pitch imposes a limitation such that the entire optical device cannot be miniaturized when the optical input/output part is included. Therefore, there is a demand for a technique for optical connection at a pitch equal to or smaller than the pitch that is limited by the cladding diameter of the optical fiber.

Commonly, for optical connections between optical fibers, between an optical fiber and an optical device, and between optical devices, a butt coupling technique is known in which the optical connection is performed in the state where connection end surfaces orthogonal to the optical axis of the optical device are disposed to face each other and are positioned such that their axes of the core positions are not shifted from each other. Furthermore, a spatial connection is also widely used that connects, again to the optical device, a light beam emitted from a connection end surface orthogonal to the optical axis of the optical device by collecting the light beam through a spatial optical system such as a lens.

Disadvantageously, the above-described butt coupling technique has a significant limitation on installation in terms of matching of the thermal expansion coefficient and the mode diameter of the guided light in addition to the necessity to dispose the optical connection surfaces of the optical devices in a facing relationship. In addition, the spatial optical coupling also has a limitation due to the expansion of the beam diameter and a limitation on manufacture of micro lenses, mirrors, and the like, and miniaturization of the connection pitch and improvement in mass manufacturability are technically limited.

As a technique for removing the above-described limitations, a technique for connecting between optical devices with a resin optical waveguide has been proposed. For example, there is a method of guiding light within a resin to optically connect (optical connection) between optical fibers, between an optical fiber and an optical device, and between optical devices by producing any optical three-dimensional wiring pattern by an optical connection using a self-written waveguide or a nano-level stereolithography technique using the two-photon absorption disclosed in Non Patent Literature (NPL) 1.

This is a technique to perform stereolithography and is also known as a three-dimensional printer of stereolithography type in which a resist solution (light curing resin solution) or the like, which is a raw material of the resin, is developed on a substrate, a light beam from a laser is collected through a lens or the like, two-photon absorption is induced on a light collecting portion of the light beam to cure only the resin at the light collecting portion, and scanning with the laser is further performed to move the light collecting portion to any location, thereby performing the stereolithography.

In particular, the technique of stereolithography using two-photon absorption, which is well known to have a very small light collection size, can achieve nano-level stereolithography when used with a micro-driven scanning unit. There is a method for optical connection to an optical device to be connected by using the above-described technique and using micro-resin optical wiring (optical waveguide) with a core composed of a resin itself shaped as disclosed in NPL 1.

CITATION LIST

Non Patent Literature

NPL 1: N. Lindenmann et al., "Photonic Wire Bonding: a novel concept for chip-scale interconnects", Optics Express, vol. 20, no. 16, pp. 17667-17677, 2012.

SUMMARY

Technical Problem

However, in the techniques described above, since the whole optical device is fixed to a stereolithography apparatus and thereafter light curing of a resin optical waveguide is performed to form the resin optical waveguide, mounting of the optical device is troublesome work. In addition, due to limitations in dimension, size, and the like of the optical device, the optical device may not be introduced into the stereolithography apparatus in some case. Furthermore, in order to remove an uncured resist solution after the light curing performed in the stereolithography, when the optical device is immersed in a removal solvent, such a concern exists that the removal solvent may contaminate or damage the optical device. In the method of forming a resin optical waveguide directly on the optical device, the yield of the polymer waveguide formation directly relates to the yield of the device connection structures, thereby leading to a reduction in the overall yield. As described above, in the techniques of the related art, the manufacturing of the optical connection structure is complicated, and there is a problem of a reduction in manufacturing yield of the optical connection structures.

Embodiments of the present invention have been contrived to solve the above-described problems, and an object thereof is to make it possible to manufacture optical connection structures at a higher manufacturing yield without doing troublesome work.

Means for Solving the Problem

An optical connection component according to embodiments of the present invention includes a plate-shaped substrate provided with a first input/output end and a second input/output end and configured to transmit light to be used, and an optical waveguide formed by a resin core configured to optically connect the first input/output end and the second input/output end.

In one configuration example of the optical connection component, a wave guiding direction at the first input/output end and a wave guiding direction at the second input/output end are a normal direction of a surface of the plate-shaped substrate.

In one configuration example of the optical connection component, the resin core is formed with a light-cured resin.

An optical connection structure according to embodiments of the present invention includes the aforementioned optical connection component and a first optical component configured to optically connect to the first input/output end via the plate-shaped substrate.

In one configuration example of the optical connection structure, the first optical component is an optical device or optical fiber including an optical waveguide.

In one configuration example of the optical connection structure, there is provided a second optical component configured to optically connect to the second input/output end via the plate-shaped substrate.

In one configuration example of the optical connection structure, the second optical component is an optical device or optical fiber including an optical waveguide.

Effects of Embodiments of the Invention

As described above, according to embodiments of the present invention, an optical connection component is used in which a resin optical waveguide formed by a resin core is optically connected to a first input/output end and a second input/output end of a plate-shaped substrate provided with the first input/output end and the second input/output end and configured to transmit light to be used, thereby making it possible to obtain such an excellent effect that optical connection structures can be manufactured at a higher manufacturing yield without doing troublesome work.

DETAILED DESCRIPTION OF ILLUSTRATIVE EMBODIMENTS

Optical connection components according to embodiments of the present invention will be described below.

First Embodiment

Figure 1:
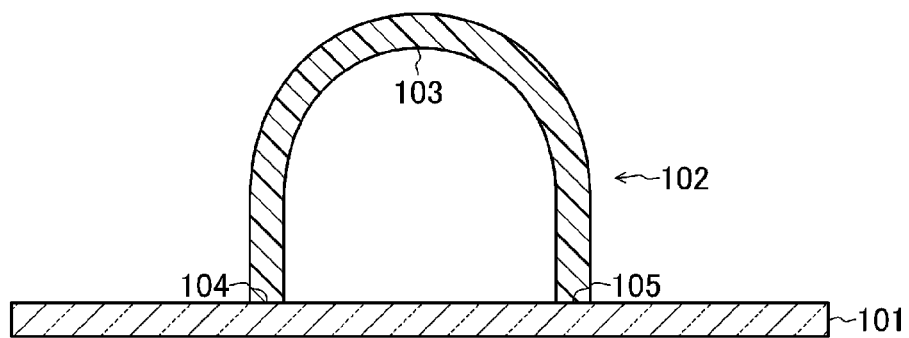
FIG. 1 is a cross-sectional view illustrating a configuration of an optical connection component according to a first embodiment of the present invention.

First, an optical connection component according to a first embodiment of the present invention will be described with reference to FIG. 1. The optical connection component is constituted of a plate-shaped substrate 101 configured to transmit light to be used, and a resin optical waveguide 102. The substrate 101 may be constituted of glass, quartz, silicon, or the like that is transparent with respect to light to be used, for example, light having a wavelength of the 1.55 µm band. The resin optical waveguide 102 is constituted of a resin core 103 formed with a resin through which light to be used passes. For example, the resin core 103 is formed with a light-cured resin. The resin optical waveguide 102 in the configuration exemplified in FIG. 1 uses air surrounding the resin core 103 as a cladding.

The substrate 101 includes a first input/output end 104 and a second input/output end 105, and the resin optical waveguide 102 optically connects the first input/output end 104 and the second input/output end 105. The first input/output end 104 and the second input/output end 105 are disposed separate from each other on a surface of the substrate 101. For example, the resin core 103 has a folded back structure in which the resin core 103 once separates from the surface of the substrate 101 and then returns to the surface of the substrate 101, and is optically connected to each of the first input/output end 104 and the second input/output end 105. The resin core 103 is formed in a folded back structure having a U shape, for example. The resin core 103 is not limited to a U shape, and it is only required to have a folded back structure. A wave guiding direction at the first input/output end 104 and a wave guiding direction at the second input/output end 105 of the resin optical waveguide 102 are a normal direction of the surface of the substrate 101.

For example, light incident on the first input/output end 104 of the substrate 101 travels through the resin optical waveguide 102 and is emitted to the outside from the second input/output end 105.

Figure 2A:
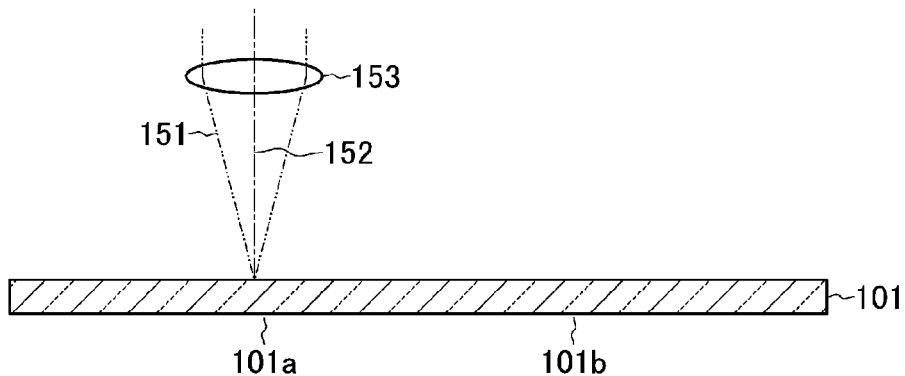
FIG. 2A is an explanatory diagram illustrating a state of an optical connection component in each of steps to describe a method for forming the optical connection component in the first embodiment of the present invention.

Next, a method of forming the optical connection component described above will be described using FIGS. 2A and 2B. First, as illustrated in FIG. 2A, the surface of the substrate 101 is disposed being oriented in a direction in which exposing light 151 for exposure is radiated. In addition, the surface of the substrate 101 is so disposed at a predetermined position as to be perpendicular to a direction (an optical axis 152 of the exposing light 151) in which the exposing light 151 is radiated (first step). The exposing light 151 is emitted from a light source (not illustrated), such as a laser, and is collected by an optical system 153 configured of a lens or the like.

Figure 2B:
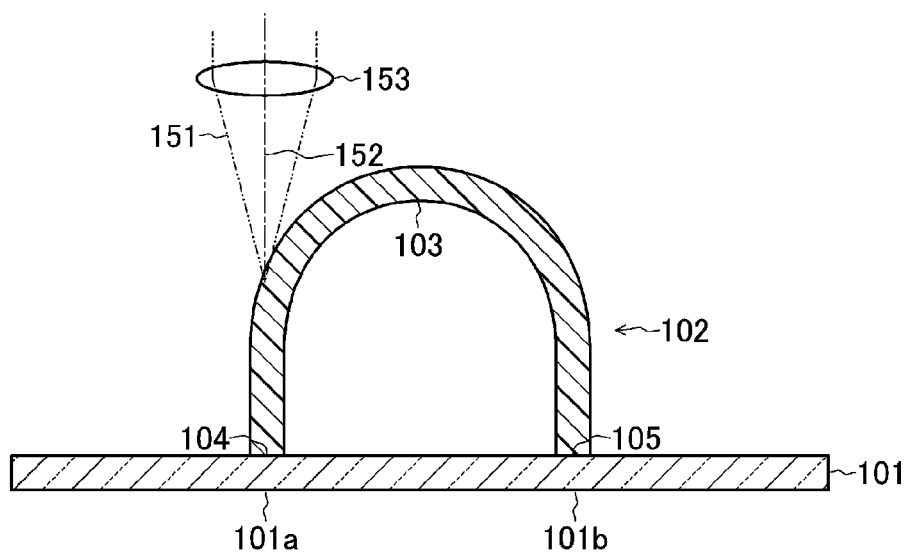
FIG. 2B is an explanatory diagram illustrating a state of the optical connection component in each of the steps to describe the method for forming the optical connection component in the first embodiment of the present invention.

Next, as illustrated in FIG. 2B, by curing a light curing resin by the irradiation with the exposing light 151, the resin core 103 is formed by the light curing resin being light-cured from a first location 101a to a second location 101b of the substrate 101. A resin that transmits light when being light-cured is used as the light curing resin. For example, the resin core 103 is formed in a U shape. By forming the resin core 103, the resin optical waveguide 102 configured to optically connect to each of the first input/output end 104 and the second input/output end 105 disposed separate from each other on the surface of the substrate 101 is formed (second step). In this step, the trajectory of the exposing optical system for forming the resin may be any of those of the techniques used in a three-dimensional printer or the like. For example, the resin is formed to be layered from each of the first location 101a and the second location 101b, and each of the resins layered from each of the first location 101a and the second location 101b is joined to each other near the apex.

In the forming step (second step) to form the resin optical waveguide 102 by the resin described above, the first input/output end 104 and the second input/output end 105, which are starting points of the stereolithography, can be easily observed from the laser (exposing light) and the lens (optical system). In this case, there is no shield for blocking the exposing light. As a result, it is possible to form resin wiring in a highly efficient and minute region between two optical devices.

The method of stereolithography is now described in more detail.

As a first method, a film of photoresist is first formed on an end surface of an optical device by applying a photoresist represented by an ultraviolet (UV) curing resin, SU8, and the like. Alternatively, the end surface of the optical device is immersed in a container filled with the photoresist.

Next, UV light emitted from a laser for waveguide formation is collected and radiated via a predetermined optical system. The irradiation locations are scanned to form any desired resin optical waveguide. Since the photoresist irradiated with UV light is light-cured, by scanning the irradiation locations, the resin is cured along the scanning trajectory, thereby making it possible to form the resin optical waveguide. In the scanning of the irradiation locations, the light source and the optical system, for example, are made to scan the irradiation locations by using a motor, a piezo stage, or the like.

As a second method, there is a method in which stereolithography is performed by using a femtosecond laser, as a laser, having a wavelength longer than the wavelength at which the light curing resin is cured. In this method, two-photon absorption of the wavelength at which the resin is cured due to a nonlinear effect is generated at a location where light has a constant light intensity by being collected. The light collecting location where the two-photon absorption is generated is scanned in a similar manner to the method described above, thereby forming the resin optical waveguide. This method, as is well-known, makes it possible to perform high-accuracy and nano-level stereolithography.

As described above, when the resin in the uncured region is removed after the stereolithography is performed by the light curing, the resin optical waveguide 102 made by the resin core 103 can be formed. It is preferable for the resin to have high transmittance at a wavelength of light to be input/output to/from the optical device, although the propagation distance is significantly short.

The diameter of the resin core 103 may take any size (diameter) as long as it allows light to propagate, but from the view point of reducing connection loss and reducing bending loss, it is preferable for the diameter thereof to be a diameter that allows the light to propagate as a single mode while using an air layer as a cladding layer. The conditions of the single mode can be calculated from the refractive index of the resin. From the view point of performing micro-bending, a smaller diameter of the resin core is preferable. From the view point of the two points described above, the diameter of the resin core is preferably equal to or smaller than 10 μm, and more preferably equal to or smaller than 3 μm.

Figure 3:
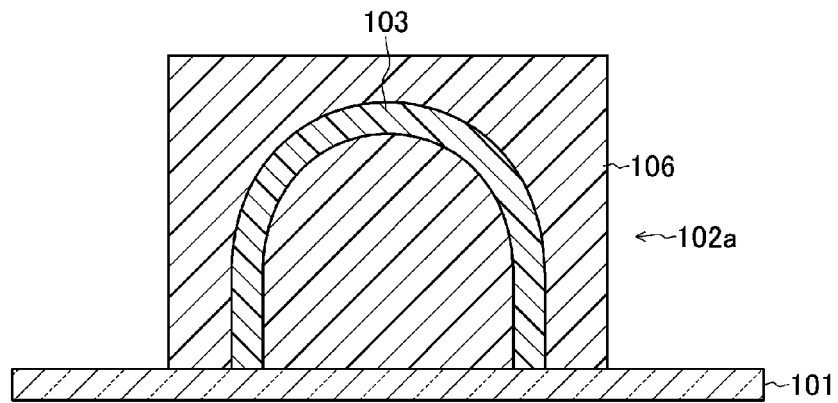
FIG. 3 is a cross-sectional view illustrating a configuration of another optical connection component according to the first embodiment of the present invention.

As illustrated in FIG. 3, a resin optical waveguide iota can be achieved by forming a cladding layer 106 covering the resin core 103, in a case where the confinement cannot be achieved by the air cladding, or the like. As described above, after the resin core 103 is formed by the stereolithography by the light curing, the resin core 103 is buried with a cladding material to form the cladding layer 106. The cladding material is a material having a smaller refractive index than the resin core 103. By forming the cladding layer 106, mechanical strength of the resin core 103 may be reinforced.

Figure 4:
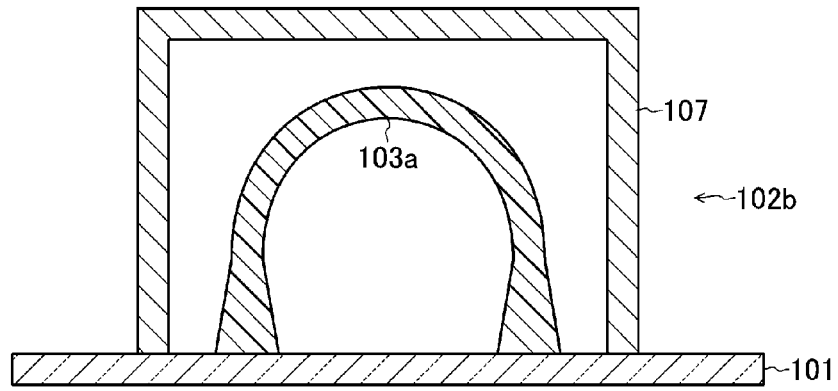
FIG. 4 is a cross-sectional view illustrating a configuration of another optical connection component according to the first embodiment of the present invention.

Furthermore, as illustrated in FIG. 4, for example, a resin optical waveguide 102b may be achieved by a resin core 103a having a larger diameter (mode diameter) as the resin core 103a approaches the substrate 101. As illustrated in FIG. 4, it is also possible to include a hollow outer wall structure 107 configured to house the resin core 103a. Inside the outer wall structure 107, an enclosed space is formed, for example.

The outer wall structure 107 may be constituted of a resin, for example. In this case, the outer wall structure 107 may be constituted of the same resin as the resin core 103a. The material of the outer wall structure 107 is not limited to resin, and may be constituted of glass, a semiconductor, metal, or the like. The outer wall structure 107 is formed to be spaced apart from the resin core 103a in such a manner as to sufficiently secure a region serving as a cladding of the resin optical waveguide 102b between an inner wall of the outer wall structure 107 and the resin core 103a.

By providing the outer wall structure 107, it is possible to suppress the attachment of the surrounding dust, debris, and the like to the resin core 103a. By providing the outer wall structure 107 to suppress the attachment of dust and the like to the resin core 103a, light radiation loss can be suppressed, and a low-loss property can be reliably maintained. This effect is enhanced when the outer wall structure 107 has an airtight structure. In addition, the resin core 103a can be prevented from being accidentally touched and broken, or the like, and the mechanical reliability can be increased.

Figure 5:
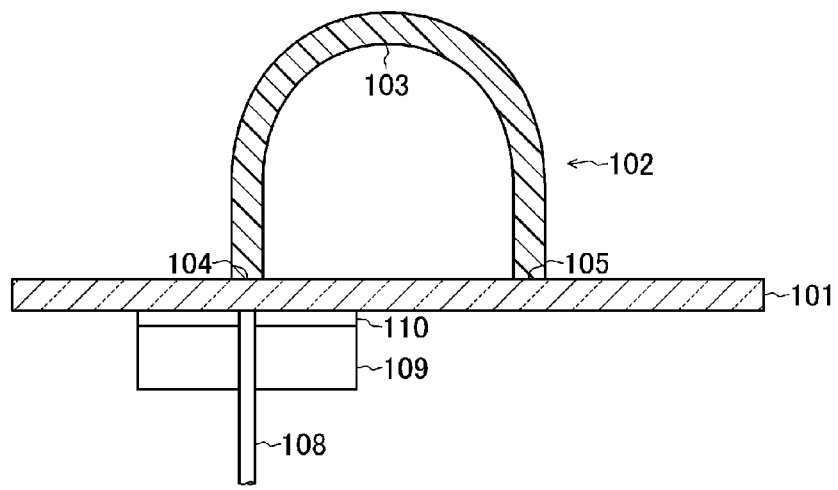
FIG. 5 is a cross-sectional view illustrating a configuration of an optical connection structure to which an optical connection component according to the first embodiment of the present invention is applied.

An optical connection structure using an optical connection component according to the first embodiment will be described below. For example, as illustrated in FIG. 5, an optical fiber (first optical component) 108 may be optically connected to the resin optical waveguide 102 at the first input/output end 104 of the substrate 101. The optical fiber 108 is fixed to the substrate 101 by a fixing member 109. The fixing member 109 is bonded to a rear surface of the substrate 101 with an adhesive layer 110 formed by an adhesive agent. The fixing member 109 is constituted of a V-shaped groove substrate in which a V-shaped groove or the like configured to house the optical fiber 108 is formed, and an adhesive structure of a flat substrate, where a connection end surface thereof is flattened by having experienced dicing, polishing, or the like.

The optical fiber 108 is fixed to the substrate 101 in a state of being optically connected to the resin optical waveguide 102 with low loss. More specifically, the core of the optical fiber 108 and the resin core 103 are axially aligned in a state in which there is no axial shift from each other, and the optical fiber 108 is fixed to the substrate 101. For example, input light from the optical fiber 108 is coupled to the resin optical waveguide 102 at the first input/output end 104 through the adhesive layer 110 and the substrate 101, propagates in the resin optical waveguide 102, and is emitted to the outside from the second input/output end 105 through the substrate 101. The same applies to a case in which the first input/output end 104 and the second input/output end 105 are exchanged.

Figure 6:
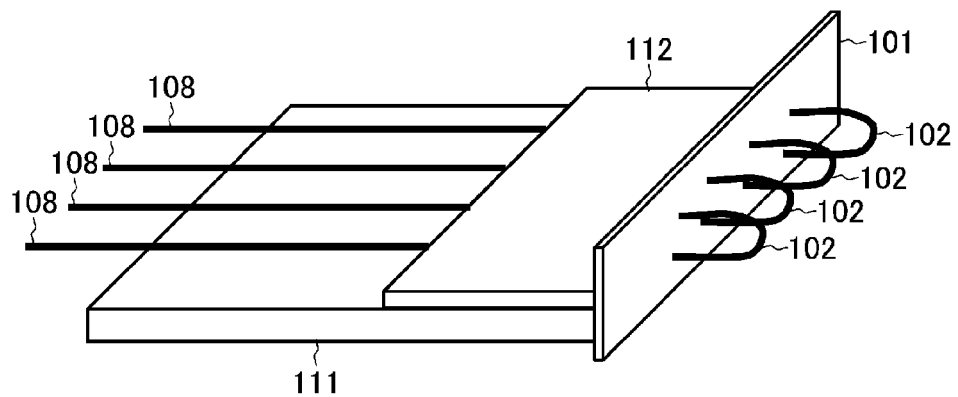
FIG. 6 is a perspective view illustrating a configuration of an optical connection structure to which an optical connection component according to the first embodiment of the present invention is applied.

As illustrated in FIG. 6, it is also possible to connect the optical fiber 108, by using an optical connection component formed with the substrate 101 provided with a plurality of the resin optical waveguides 102, to one of the input/output ends of each of the plurality of resin optical waveguides 102 via the substrate 101. FIG. 6 illustrates an example in which four optical fibers 108 are connected to the substrate 101 provided with four resin optical waveguides 102. The optical fibers 108 are arranged on a V-shaped groove substrate 111 and are fixed to the V-shaped groove substrate in by being pressed by a flat substrate 112. Although not illustrated, an adhesive layer formed by an adhesive agent is formed between the V-shaped groove substrate 111 and the flat substrate 112, and the substrate 101, so as to bond and fix the substrates to each other.

It is more preferable that the thickness of the adhesive layer and the plate thickness of the substrate 101 be thinner. While the emitted light from the optical fiber 108 has intensity distribution close to the Gaussian distribution in a case of the single mode propagation, the beam mode diameter of the emitted light gradually widens as it passes through a portion not having a wave guide structure such as the adhesive layer and the substrate 101. The diameter of the resin core 103 at one of the input/output ends of the resin optical waveguide 102 formed on the substrate 101 may be appropriately designed in accordance with the mode beam diameter after the widening of the beam mode diameter of the emitted light.

However, in the folded back structure of the resin optical waveguide 102 at the rear of the input/output end or the like, it is necessary to reduce the diameter as described above. As such, as described by using FIG. 4, the resin core 103a, the mode diameter of which is larger as it approaches the substrate 101, is used, and it is possible to reduce a change in diameter of the resin core 103a as the widening of the mode diameter is smaller. Thus, as the adhesive layer and the substrate 101 are thinner, the optical connection structure with a smaller size and smaller loss may be formed. Preferably, the thickness of the adhesive layer is equal to or smaller than 10 μm, and the thickness of the substrate 101 is equal to or smaller than 0.5 mm. More preferably, the thickness of the substrate 101 is equal to or smaller than 0.3 mm.

Figure 7:
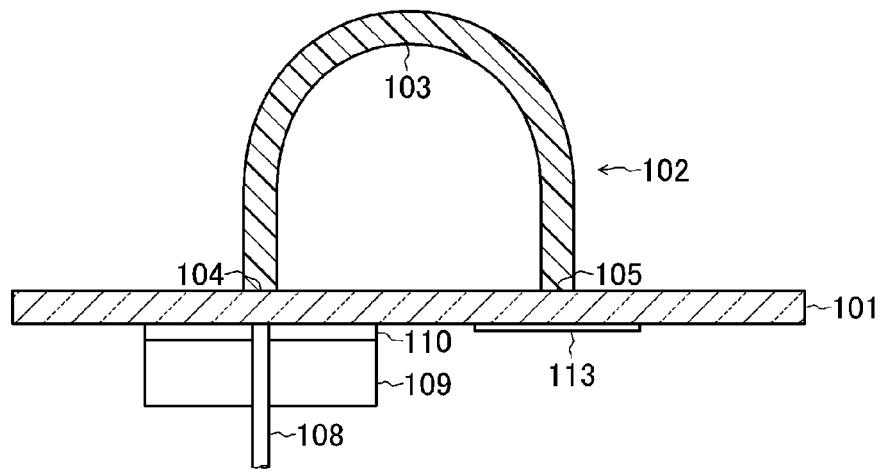
FIG. 7 is a cross-sectional view illustrating a configuration of another optical connection structure to which an optical connection component according to the first embodiment of the present invention is applied.

As illustrated in FIG. 7, an anti-reflection coating (AR) film 113 may be formed on part of or the entirety of the rear surface of the substrate 101. The AR film 113 may be formed on the rear surface of the substrate 101 at a portion of the second input/output end 105, or may be formed on the rear surface of the substrate 101 at a portion of the first input/ output end 104. In addition, the AR film 113 may also be formed on the rear surface of the substrate 101 at the portion of the first input/output end 104 and at the portion of the second input/output end 105.

The substrate 101 may be constituted of indium tin oxide (ITO), ZnO or the like, and may allow electricity to flow therein. When the substrate 101 is electrically conductive in this way, optical connection components may be more effectively used also for applications of an optical device requiring a power supply, a high frequency connection, and the like.

Figure 8:
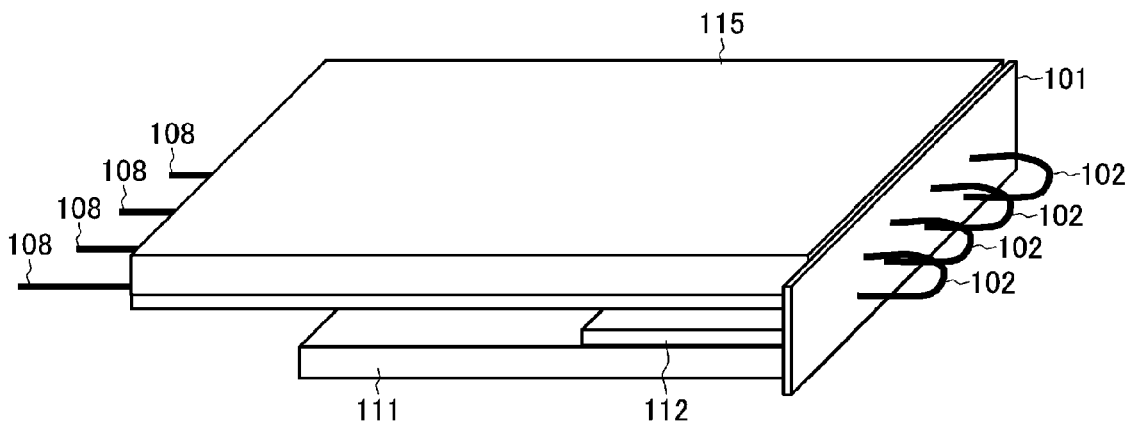
FIG. 8 is a perspective view illustrating a configuration of another optical connection structure to which an optical connection component according to the first embodiment of the present invention is applied.

By using the optical connection component of the first embodiment, an optical connection structure as illustrated in FIG. 8 may be achieved. This optical connection structure combines an optical waveguide type optical device (first optical component) 115 with an optical connection component. The optical device 115 is constituted of an optical waveguide formed by a thin silicon wire. This optical waveguide may be manufactured as described below. First, by using a well-known silicon on insulator (SOI) substrate or the like, a surface Si layer thereof is patterned by a known photolithographic technique, a known etching technique, and the like, thereby forming a core layer for constituting an optical waveguide (optical circuit). Next, for example, silicon oxide is deposited by a well-known deposition method such as plasma CVD to form a cladding layer, and thus the optical waveguide is formed.

The optical device 115 may also be constituted of a planar lightwave circuit made of a quartz glass thin film formed through deposition on a silicon substrate, for example. The present invention is not limited thereto as long as the device is an optical waveguide device having an optical wave guide mechanism. For example, as the substrate, the optical waveguide, or the like, in addition to quartz glass, an organic polymer, a semiconductor or compound semiconductor waveguide of Si, silicon nitride (SiN), gallium arsenide, indium phosphorus (InP) or the like, and a dielectric such as lithium niobate (LN) and periodically poled lithium niobate (PPLN), as described in Background Art, may be used.

In the case of an optical device that propagates and inputs/outputs light, its functions may be adaptable as appropriate thereto. For example, the optical device may also be provided with a light emitting element such as a laser, a light receiving element such as a photodiode, a light modulator, and the like, in addition to the optical waveguide. In addition, the optical device may also be provided with any optical functional element such as an optical amplifier, an isolator, a polarization rotation and separation element, a light attenuator, and the like. In the optical device, for example, various optical circuits for processing signals, and various optical functional elements for light emission, light reception, modulation, control, and the like may be integrated. The present invention has its features in the optical connection structure with the optical device, regardless of the circuit configuration, the circuit functions, or the like of the optical device. For the embodiment of the present invention, a detailed description of the contents of the optical device is omitted.

The core of the optical waveguide constituting the optical device 115 and the resin core constituting the resin optical waveguide 102 are axially aligned, bonded, and fixed to each other in such a manner as to be optically connected with low loss and with no axial shift, as described before. An adhesive layer is formed between the optical device 115 and the substrate 101, but it is omitted in FIG. 8. The core of each optical waveguide constituting the optical device 115 is optically connected to the resin optical waveguide 102 made of the resin core formed by stereolithography, via the adhesive layer and the substrate 101.

According to the first embodiment described above, by using the optical connection component constituted of the substrate 101 and the resin optical waveguide 102, significant effects as described below are achieved.

First, in comparison with a technique of the related art in which, for example, an optical fiber and an optical device are disposed facing each other and are optically connected by butt coupling or the like, it is possible to achieve an optical connection structure in which an optical fiber and an optical device are connected by the resin optical waveguide 102 in the folded back structure, thereby making it possible to significantly relax the restriction of mounting in a minute region.

In comparison with a forming case in which a resin core is directly connected to the core of an optical fiber, an end surface of the core of an optical waveguide of an optical device, or the like, it is unnecessary to dispose an optical device, an optical fiber, or the like in a stereolithography apparatus configured to form an optical connection component because a separated optical connection component is used, which makes a mounting process significantly easy to carry out. In addition, since a stereolithography apparatus is not used in forming an optical connection structure, the present invention is also applicable to optical devices, optical fibers, and the like unable to be introduced into a stereolithography apparatus due to the restriction of dimensions or the like.

In the stereolithography of the related art, since the resin core is formed directly on the optical device, such an incident occurs that the optical device is contaminated or damaged by a removal solvent used when removing uncured portions of the resin having been irradiated with no light, or the like. In contrast, according to the first embodiment, the resin core is not formed directly on the optical device, so that it is possible to ignore the contamination and damage to the optical device caused by the removal solvent, which leads to significant simplification of the process and constraint mitigation on the process. Furthermore, in the manufacturing, an optical connection structure can be formed by using a non-defective optical connection component, and as a result, the yield can be improved.

Second Embodiment

Figure 9:
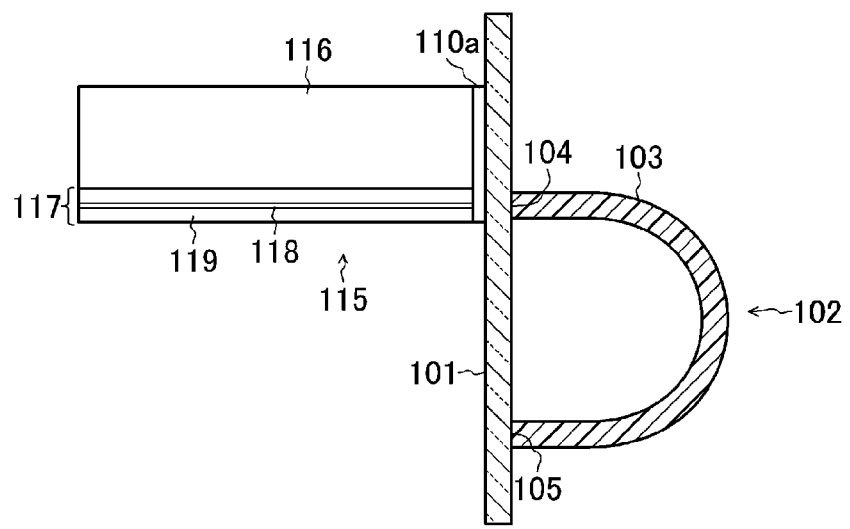
FIG. 9 is a cross-sectional view illustrating a configuration of an optical connection structure according to a second embodiment of the present invention.
Figure 10:
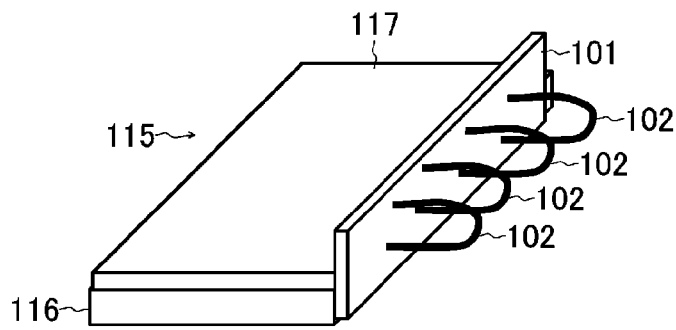
FIG. 10 is a perspective view illustrating a configuration of an optical connection structure according to the second embodiment of the present invention.

Next, an optical connection structure according to a second embodiment of the present invention will be described with reference to FIGS. 9 and 10. The optical connection structure is constituted of an optical connection component formed of a substrate 101 and a resin optical waveguide 102 made by a resin core 103, and an optical device 115. The optical connection component is the same as that of the above-described first embodiment. The optical device 115 includes a device substrate 116 and an optical waveguide layer 117 formed on the device substrate 116. The optical waveguide layer 117 includes a core 118 and a cladding 119. The optical device 115 is bonded to the rear surface of the substrate 101 with an adhesive layer 110a formed by an adhesive agent.

The optical device 115 is fixed to the substrate 101 in a state in which an optical waveguide made of the core 118 in the optical waveguide layer 117 is optically connected to the resin optical waveguide 102 at a first input/output end 104 with low loss. More specifically, at the first input/output end 104, the core 118 and the resin core 103 are axially aligned in a state in which there is no axial shift from each other, and the optical device 115 is fixed to the substrate 101. The optical waveguide made of the core 118 may be optically connected to the resin optical waveguide 102 at a second input/output end 105. As illustrated in FIG. 10, the optical connection component may include a plurality of the resin optical waveguides 102 on the substrate 101. Corresponding to each of a plurality of the optical waveguides formed in the optical waveguide layer 117 of the optical device 115, each of the plurality of resin optical waveguides 102 optically connects thereto via the substrate 101.

Figure 11:
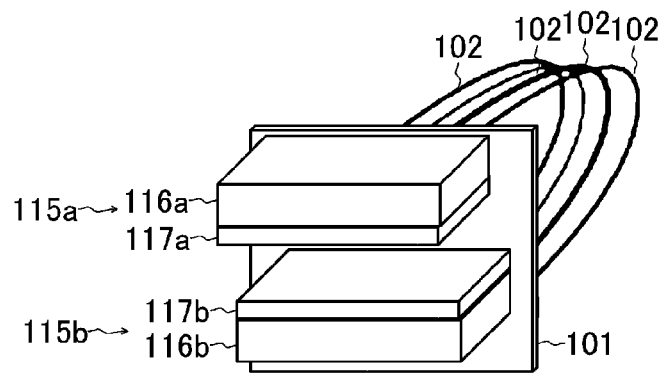
FIG. 11 is a perspective view illustrating a configuration of another optical connection structure according to the second embodiment of the present invention.

As illustrated in FIG. 11, a first optical device (first optical component) 115a and a second optical device (second optical component) 115b may also be connected to the optical connection component constituted of the substrate 101 and the resin optical waveguides 102. The first optical device 115a and the second optical device 115b are each bonded to the rear surface of the substrate 101 with an adhesive layer (not illustrated).

The first optical device 115a includes a first device substrate 116a and a first optical waveguide layer 117a formed on the first device substrate 116a. The first optical waveguide layer 117a includes a core and a cladding, although not illustrated. The second optical device 115b includes a second device substrate 116b and a second optical waveguide layer 117b formed on the second device substrate 116b. The second optical waveguide layer 117b includes a core and a cladding, although not illustrated.

For example, the first optical device 115a is fixed to the substrate 101 in a state in which an optical waveguide made of the core in the first optical waveguide layer 117a of the first optical device 115a is optically connected to the resin optical waveguide 102 at the first input/output end 104 with low loss. The second optical device 115b is fixed to the substrate 101 in a state in which an optical waveguide made of the core in the second optical waveguide layer 117b of the second optical device 115b is optically connected to the resin optical waveguide 102 at the second input/output end 105 with low loss.

For example, the first optical device 115a and the second optical device 115b are disposed in a state in which the first optical waveguide layer 117a and the second optical waveguide layer 117b face each other. A pedestal may be disposed between the first optical waveguide layer 117a and the second optical waveguide layer 117b for fixing these layers, and the first optical waveguide layer 117a and the second optical waveguide layer 117b may be fixed to the pedestal. Alternatively, an adhesive resin may be filled between the first optical waveguide layer 117a and the second optical waveguide layer 117b, and these layers may be integrally fixed. An interval between the core of the first optical waveguide layer 117a and the core of the second optical waveguide layer 117b may be set to be approximately 100 μm, for example.

As described above, by connecting the first optical device 115a and the second optical device 115b to the optical connection component constituted of the substrate 101 and the resin optical waveguides 102, it is possible to optically connect the first optical device 115a and the second optical device 115b via the optical connection component.

Figure 12:
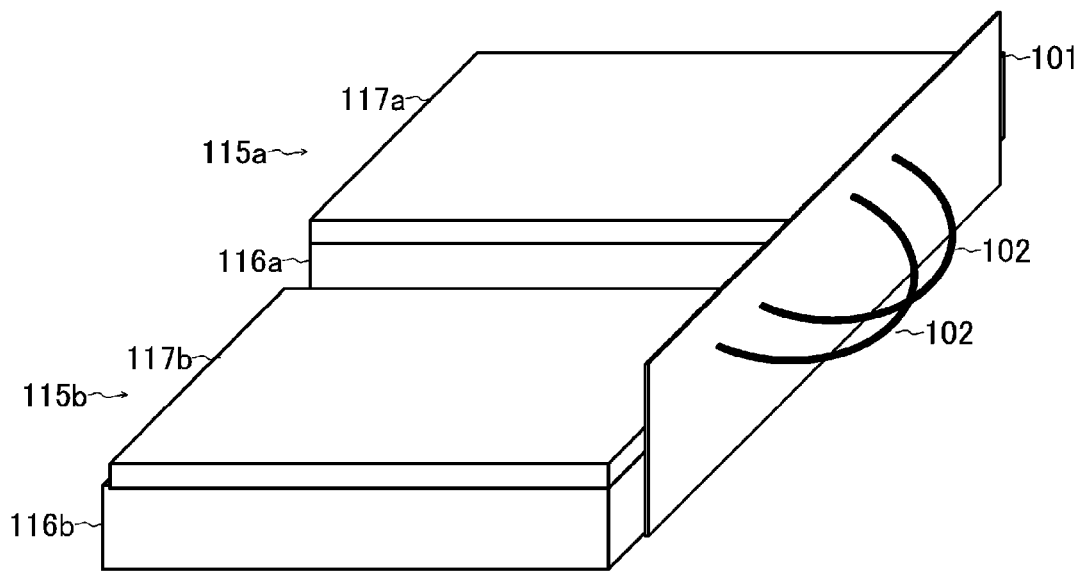
FIG. 12 is a perspective view illustrating a configuration of another optical connection structure according to the second embodiment of the present invention.

As illustrated in FIG. 12, the first optical device 115a and the second optical device 115b may also be connected to the optical connection component constituted of the substrate 101 and the resin optical waveguides 102 in a state in which the surface of the first optical waveguide layer 117a and the surface of the second optical waveguide layer 117b face in the same direction.

As described above, by connecting the first optical device 115a and the second optical device 115b with the use of the optical connection component, significant effects as described below are obtained.

In comparison with a case in which, as in the technique of the related art, two optical devices are disposed facing each other and are connected by butt coupling or the like, it is possible to achieve an optical connection structure in which an optical connection between the optical devices is implemented by the resin optical waveguide in the folded back structure, thereby making it possible to significantly relax the restriction of mounting in a minute region.

In comparison with a forming case in which a resin core is directly connected to an end surface of the core of an optical waveguide of an optical device, it is unnecessary to dispose an optical device, an optical fiber, or the like in a stereolithography apparatus configured to form an optical connection component because a separated optical connection component is used, which makes a mounting process significantly easy to carry out. In addition, since a stereolithography apparatus is not used in forming the optical connection structure, the present invention is also applicable to optical devices unable to be introduced into a stereolithography apparatus due to the restriction of dimensions or the like.

In the stereolithography of the related art, since the resin core is formed directly on the optical device, such an incident occurs that the optical device is contaminated or damaged by a removal solvent used when removing uncured portions of the resin having been irradiated with no light, or the like. In contrast, according to the first embodiment, the resin core is not formed directly on the optical device, so that it is possible to ignore the contamination and damage to the optical device caused by the removal solvent, which leads to significant simplification of the process and constraint mitigation on the process. Furthermore, in the manufacturing, an optical connection structure can be formed by using a non-defective optical connection component, and as a result, the yield can be improved.

Third Embodiment

Figure 13:
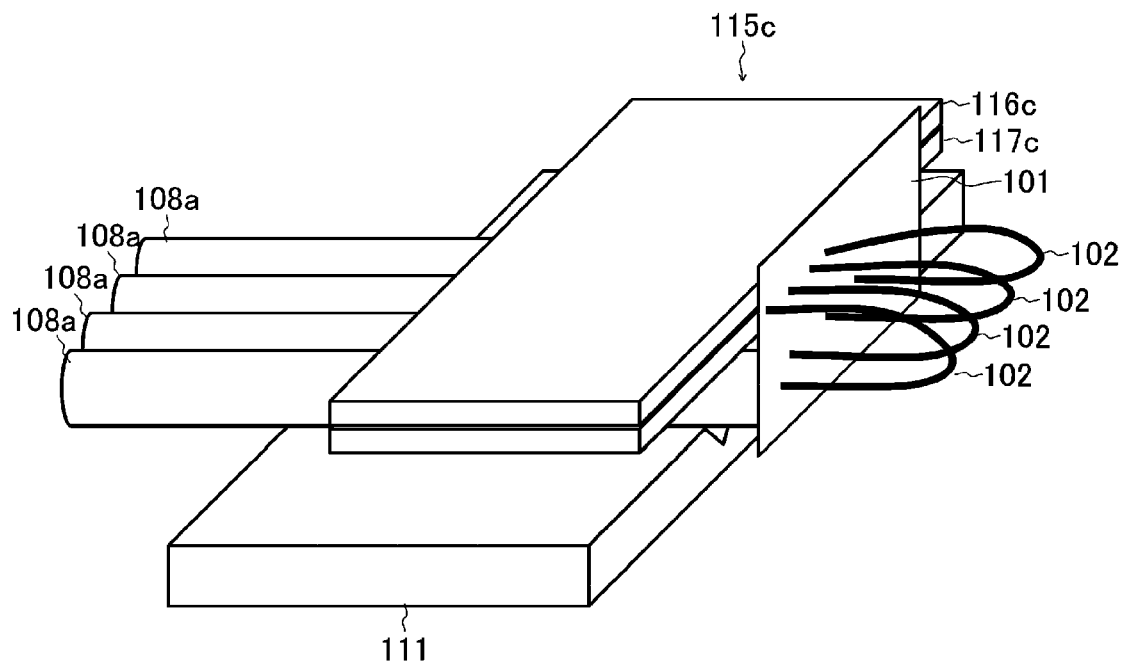
FIG. 13 is a perspective view illustrating a configuration of an optical connection structure according to a third embodiment of the present invention.

Next, an optical connection structure according to a third embodiment of the present invention will be described with reference to FIG. 13. The optical connection structure is constituted of an optical connection component formed of a substrate 101 and a resin optical waveguide 102 made by a resin core 103, an optical device (first optical component) 115c, and an optical fiber (second optical component) 108a. The optical connection component is the same as that of the above-described first and second embodiments.

The optical device 115c includes a device substrate 116c and an element formation layer 117c formed on the device substrate 116c. A laser element of an optical waveguide type is formed in the element formation layer 117c, for example. The optical device 115c is bonded to the rear surface of the substrate 101 with an adhesive layer 110a formed by an adhesive agent.

The optical fibers 108a are arranged on a V-shaped groove substrate 111 and are fixed to the V-shaped groove substrate 111 by being pressed by the element formation layer 117c. Although not illustrated, an adhesive layer formed by an adhesive agent is formed between the V-shaped groove substrate 111 and the device substrate 116c, and the substrate 101, so that the substrates are bonded and fixed to each other.

The optical device 115c is fixed to the substrate 101 in a state in which a laser beam output end of the element formation layer 117c is optically connected to the resin optical waveguide 102 at a first input/output end 104 with low loss. More specifically, at the first input/output end 104, an optical axis of the laser beam outputted from the laser beam output end and the resin core 103 are axially aligned in a state in which there is no axial shift from each other, and the optical device 115c is fixed to the substrate 101. The optical fiber 108a is optically connected to the resin optical waveguide 102 via the substrate 101 at a second input/output end 105.

With the above-discussed configuration, the laser beam emitted from the element formation layer 117c may be coupled to the optical fiber 108a via the resin optical waveguide 102. Consequently, in comparison with a case in which, as in the technique of the related art, an optical device (laser element) and an optical fiber are disposed facing each other and are optically connected, it is possible to achieve an optical connection structure in which an optical connection between the optical device and the optical fiber is implemented by the resin optical waveguide in the folded back structure, thereby making it possible to significantly relax the restriction of mounting in a minute region.

In comparison with a forming case in which the resin core is directly connected to the laser beam output end surface of the laser element and each of the end surfaces of the optical fibers, it is unnecessary to dispose an optical device, an optical fiber, or the like in a stereolithography apparatus configured to form an optical connection component because a separated optical connection component is used, which makes a mounting process significantly easy to carry out. In addition, since a stereolithography apparatus is not used in forming the optical connection structure, the present invention is also applicable to optical devices unable to be introduced into a stereolithography apparatus due to the restriction of dimensions or the like.

In the stereolithography of the related art, since the resin core is formed directly on the optical device, such an incident occurs that the optical device is contaminated or damaged by a removal solvent used when removing uncured portions of the resin having been irradiated with no light, or the like. In contrast, according to the first embodiment, the resin core is not formed directly on the optical device, so that it is possible to ignore the contamination and damage to the optical device caused by the removal solvent, which leads to significant simplification of the process and constraint mitigation on the process. Furthermore, in the manufacturing, an optical connection structure can be formed by using a non-defective optical connection component, and as a result, the yield can be improved.

Figure 14:
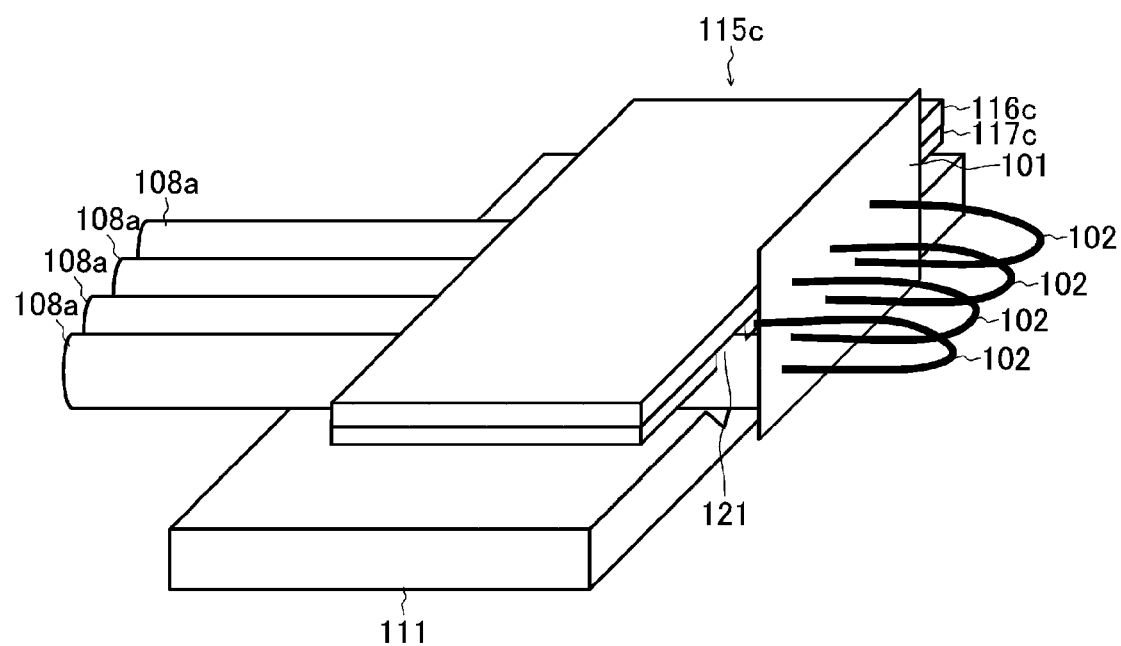
FIG. 14 is a perspective view illustrating a configuration of another optical connection structure according to the third embodiment of the present invention.

As described above, the optical fiber 108a is fixed by being pressed by the element formation layer 117c. In order to more uniquely determine the position of each portion, the surface (top surface) of the element formation layer 117c is preferably flattened. In a case where the surface of the element formation layer 117c is not sufficiently flattened, a mechanical positioning mechanism such as a notch structure (groove structure) 121 may also be formed in the element formation layer 117c, as illustrated in FIG. 14. Part of the element formation layer 117c is selectively etched by using the device substrate 116c as an etching stop layer, so as to form the groove structure 121, in which the optical fiber 108a is fitted. This makes it possible to position the optical fiber 108a with high accuracy and further improve the manufacturing yield.

As described above, according to the present invention, an optical connection component is used in which a resin optical waveguide formed by a resin core is optically connected to a first input/output end and a second input/output end of a plate-shaped substrate provided with the first input/output end and the second input/output end and configured to transmit light to be used, thereby making it possible to manufacture optical connection structures at a higher manufacturing yield without doing troublesome work.

The present invention is not limited to the embodiments described above, and it is obvious that many modifications and combinations can be implemented by a person having ordinary knowledge in the field within the technical spirit of the present invention.

REFERENCE SIGNS LIST

101 Substrate
102 Resin optical waveguide
103 Resin core
104 First input/output end
105 Second input/output end.

The invention claimed is:

1. An optical connection component comprising:
a monolithic plate-shaped substrate comprising a first surface and a second surface opposite the first surface and a first input/output end and a second input/output end directly on and integral with the second surface of the plate-shaped substrate, the plate-shaped substrate being made of a material that is transparent with respect to light to be used, and the plate-shaped substrate being configured to transmit the light to be used from the first surface of the plate-shaped substrate to the first input/output end on the second surface of the plate-shaped substrate; and
a resin optical waveguide comprising a resin core optically connecting the first input/output end to the second input/output end.

2. The optical connection component according to claim 1, wherein a wave guiding direction at the first input/output end and a wave guiding direction at the second input/output end are normal to the second surface of the plate-shaped substrate.

3. The optical connection component according to claim 1, wherein the resin core comprises a light-cured resin.

4. The optical connection component according to claim 1, wherein the resin optical waveguide extends continuously from the first input/output end to the second input/output end.

5. The optical connection component according to claim 1, wherein the resin optical waveguide has a U shape beginning at the first input/out end and ending at the second input/output end.

6. The optical connection component according to claim 1, wherein a cladding of the resin optical waveguide is provided by air surrounding the resin core.

7. The optical connection component according to claim 1, wherein the resin optical waveguide further comprises a cladding layer covering the resin core, wherein the cladding layer has a smaller refractive index than the resin core.

8. The optical connection component according to claim 1, wherein a diameter of the resin core increases as the resin core approaches the plate-shaped substrate.

9. The optical connection component according to claim 1, wherein the material of the plate-shaped substrate is glass, quartz, or silicon.

10. An optical connection structure comprising:
a monolithic plate-shaped substrate comprising a first surface and a second surface opposite the first surface and a first input/output end and a second input/output end directly on and integral with the second surface of the plate-shaped substrate, the plate-shaped substrate being made of a material that is transparent with respect to light to be used, and the plate-shaped substrate being configured to transmit the light to be used from the first surface of the plate-shaped substrate to the first input/output end on the second surface of the plate-shaped substrate;

a resin optical waveguide comprising a resin core optically connecting the first input/output end to the second input/output end; and a first optical component configured to optically connect to the first input/output end via the plate-shaped substrate.

11. The optical connection structure according to claim 10, wherein the first optical component is an optical device or an optical fiber including an optical waveguide.

12. The optical connection structure according to claim 10, further comprising:

a second optical component configured to optically connect to the second input/output end via the plate-shaped substrate.

13. The optical connection structure according to claim 12, wherein the second optical component is an optical device or an optical fiber including an optical waveguide.

14. The optical connection structure according to claim 10, wherein the first optical component is an optical fiber.

15. The optical connection structure according to claim 10, wherein the first optical component is attached to the first surface of the plate-shaped substrate by a second substrate.

16. The optical connection structure according to claim 15, wherein the first optical component is disposed in a V-shaped groove of the second substrate.

17. The optical connection structure according to claim 15, wherein a first surface of the second substrate attached to the first optical component is normal to a second surface of the second substrate attached to the plate-shaped substrate.

18. The optical connection structure according to claim 10, wherein the material of the plate-shaped substrate is glass, quartz, or silicon.

* * * * *